United States Patent [19]
Arai

[11] 3,922,696
[45] Nov. 25, 1975

[54] POWER-DRIVEN FILM WINDING AND SHUTTER RELEASE MECHANISM

[75] Inventor: Akihiro Arai, Tokyo, Japan

[73] Assignee: Asahi Kogaku Kogyo Kabushiki Kaisha, Tokyo, Japan

[22] Filed: Nov. 13, 1974

[21] Appl. No.: 523,252

[30] Foreign Application Priority Data
Nov. 19, 1973  Japan............... 48-132701[U]

[52] U.S. Cl. ............... 354/212; 354/173; 242/71.5
[51] Int. Cl.² ............... G03B 17/42; G03B 19/04; G03B 1/12
[58] Field of Search ........... 354/212, 173; 242/71.4, 242/71.5, 71

[56] References Cited
UNITED STATES PATENTS

| | | | |
|---|---|---|---|
| 3,448,669 | 6/1969 | Suzuki | 354/173 X |
| 3,448,670 | 6/1969 | Suzuki | 354/173 |
| 3,710,705 | 1/1973 | Kimura | 354/173 X |

*Primary Examiner*—Robert P. Greiner
*Attorney, Agent, or Firm*—Christie, Parker & Hale

[57] ABSTRACT

In an automatic film transport type camera there is provided a transmission mechanism for intermittently driving a film take-in shaft in response to rotation of an electromotor shaft. A generally cylindrical camming member in the mechanism is geared for rotation with the motor shaft and has a reciprocating translatory motion imparted to it so that in the course of each revolution it translates toward and then away from a predetermined position. While it translates toward the predetermined position, the camming member is operatively engaged to transmit torque for rotating the take-in shaft. While it translates away from the predetermined position, an exposure operation is actuated.

4 Claims, 5 Drawing Figures

3,922,696

POWER-DRIVEN FILM WINDING AND SHUTTER RELEASE MECHANISM

BACKGROUND OF THE INVENTION

This invention relates to cameras of the type having an automatic film transport.

Automatic film transport type cameras have been developed to facilitate the taking of what are sometimes called "machine-gun pictures." In use, the photographer need not manually wind-up a cocking arm to advance the film in preparation for the taking of each picture. In the operation of such a camera, an unexposed portion of film must be transported to a position where it remains stationary during an exposure operation. It is important to provide a properly timed sequence of operations to ensure that certain errors do not occur such as release of the camera shutter while the film is being transported. In other words, shutter release should be effected after a predetermined holding time has elapsed. In circumstances in which artificial light is required for adequate exposure (i.e., "bulb photographing"), this holding time corresponds to the exposure time. Prior art automatic film transport type cameras have suffered from the disadvantage that a relatively complicated shutter releaser device has been required to provide this holding time.

SUMMARY OF THE INVENTION

This invention is directed to an arrangement for ensuring reliable operation of shutter release in an automatic film transport type camera. The arrangement will be seen to be compact and simple in construction.

To provide the driving torque for advancing the film, there is provided an electromotor having a rotatable shaft. A rotatable take-in shaft is provided for the film. A transmission mechanism intermittently drives the take-in shaft in response to rotation of the motor shaft so that an unexposed portion of the film is transported to a position where it remains stationary during an exposure operation. A generally cylindrical member in the transmission mechanism is geared for rotation with the motor shaft. Means are provided for imparting a reciprocating translatory motion to the cylindrical member so that in the course of each revolution it translates toward and then away from a predetermined position. Means operatively engaged with the cylindrical member while it translates toward the predetermined position rotatably drive the take-in shaft. Means actuate the exposure operation while the cylindrical member is translating away from the predetermined position.

Particularly significant preferred features include the provision of releaser means operable for directly actuating the exposure operation. A bellcrank has a first arm engaged with the releaser means so that rotation of the bellcrank about its pivot point controls the operation of the releaser means. A second arm of the bellcrank projects toward the cylindrical member. Means are provided to impart a cyclical motion to the second arm during each revolution of the cylindrical member. In the course of this cyclical motion, the end of the second arm sequentially moves from an initial position radially inwardly with respect to the cylindrical member, moves longitudinally with the cylindrical member as it translates away from the predetermined position, moves radially outwardly, and then moves longitudinally relative to the cylindrical member to return to the initial position.

Preferably, the cylindrical member includes a flange portion and a cam portion that are axially adjacent. The flange portion has a cylindrical surface against which the second arm bears while at the initial position. The flange portion also has a generally annular surface that pushes against the second arm as the cylindrical member translates away from the predetermined position. The cam portion acts against the second arm to push it radially outwardly so that it can return to the initial position.

DETAILED DESCRIPTION

Figure 1:
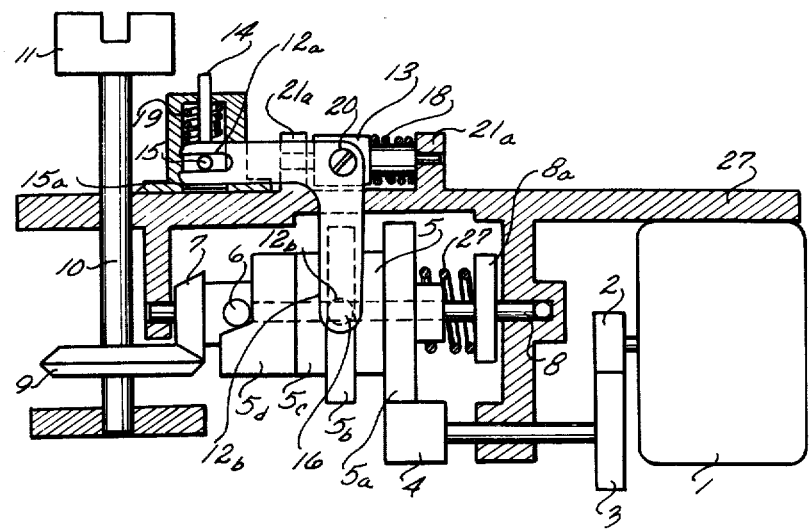
FIG. 1 is a sectional view of a portion of an automatic film transport type camera including the preferred embodiment of this invention, this view depicting a stage of operation in which film is being advanced.

An electromotor 1 shown in FIG. 1 is fixedly mounted on a body frame 21 of a camera of the automatic film transport type. A gear 2 is mounted on the electromotor shaft. The gear 2 is part of a gear train comprising gears 3 and 4. A generally cylindrical member 5 is geared for rotation with the motor shaft. To this end, a gear portion 5a of the cylindrical member 5 is meshed with the gear 4.

Figure 2:
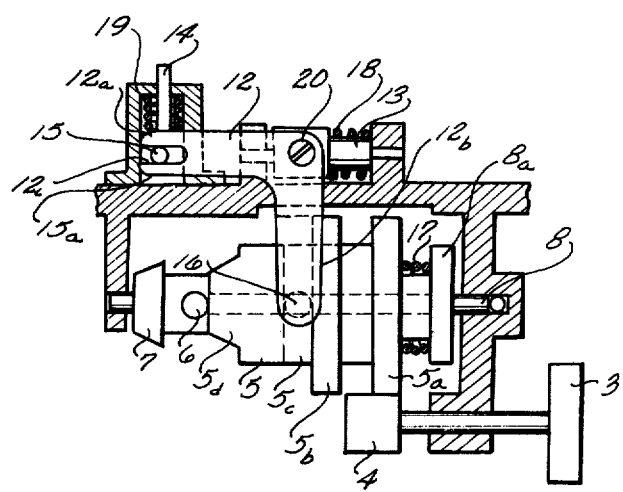
FIGS. 2 and 3 are views similar to FIG. 1, with a portion broken away to focus attention on cooperating parts involved in timing the onset of the exposure operation, FIG. 2 depicting a stage of operation at which the advancing of the film has just been completed and FIG. 3 depicting a subsequent stage of operation at which shutter release has been effected to commence the exposure operation.

As will be explained in more detail below, a reciprocal translatory motion is imparted to the member so that in the course of each revolution thereof it translates toward and then away from a predetermined position (depicted in FIG. 2). The gear 4 is somewhat elongated so that the gear portion 5a continues to mesh with it as the cylindrical member 5 translates back and forth.

In addition to the gear portion 5a, the cylindrical member 5 of the preferred embodiment includes a flange portion 5b, a circular cam portion 5c, and a cylindrical cam portion 5d. The flange portion 5b and the circular cam portion 5c are axially adjacent to each other and are located between the gear portion 5a and the cylindrical cam portion 5d.

A supporting shaft 8 is mounted to extend through an axial bore in the cylindrical member 5 and between spacedapart interior wall portions of the body frame 21. The cylindrical member 5 is slidable relative to the shaft 8. A stopper 8a is secured to the shaft 8. A spring 17 is positioned around the shaft 8 between the gear portion 5a and the stopper 8a. As the cylindrical member translates toward the predetermined position depicted in FIG. 2, the spring 17 is compressed and thereby provides a bias force tending to urge the cylindrical member to translate away from the predetermined position back toward the position depicted in

FIG. 1.

A bevel gear 7 is mounted on the shaft 8. The bevel gear 7, like the cylindrical member 5, is rotatable about the axis defined by the shaft 8; but, unlike the cylindrical member 5, does not translate. A roller 6 is planted in a shank of the bevel gear 7 and projects radially outwardly therefrom. A projecting cam surface of the cylindrical cam portion 5d intermittently drivingly engages the roller 6 as the cylindrical member rotates. This driving engagement occurs during the film transport operation phase as depicted in FIG. 1. Disengagement occurs at the end of this phase as depicted in FIG. 2. In view of this engagement and disengagement, it can be seen that a clutch mechanism is provided in the drive transmission between the electromotor shaft and the bevel gear 7.

A bevel gear 9 meshes with the bevel gear 7. The bevel gear 9 is mounted on a take-in shaft 10 for the film. The take-in shaft 10 is journaled for rotation with respect to a part of the body frame 21 and carries a joint 11 at one end for transport.

Figure 3:
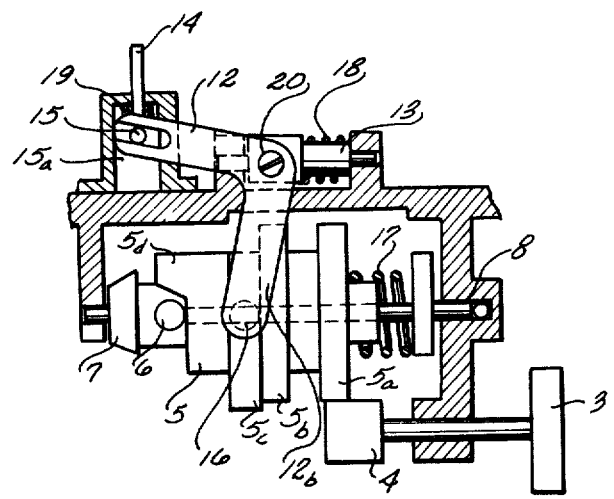
Figure 4:
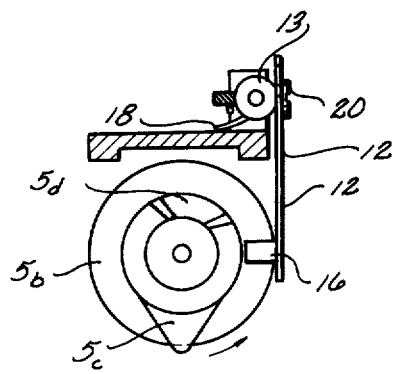
FIG. 4 is a side view of a portion of the apparatus shown in FIGS. 1 to 3 (as seen from the left), FIG. 4 depicting the same stage of operation as FIG. 3.
Figure 5:
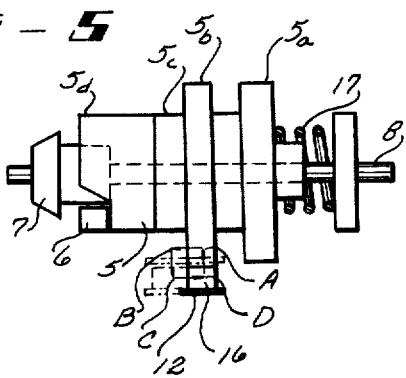
FIG. 5 is a plan view of a portion of the apparatus shown in FIGS. 1 to 3, FIG. 5 schematically illustrating a cyclical mode of operation of a bellcrank used in the preferred embodiment.

A bellcrank 12 has an arm 12a engaged with releaser means for directly actuating the exposure operation. A rotatable shaft 13 has its opposite ends journaled to rotate relative to spaced-apart tab-shaped portions 21a, 21a of the body frame 21. A spring 18 wound around the shaft 13 biases the shaft clockwise as seen in FIG. 4. A pivot 20 connects the bellcrank to the shaft 13 and therefore a depending arm 12b of the bellcrank is similarly biased in the clockwise direction. A roller 16 is provided at the end of the depending arm 12b. During the phase of operation in which the film is transported, the roller 16 bears against the circumferential cylindrical surface of the flange portion 5b (see FIG. 1). Thereafter, owing to the translation of the cylindrical member 5 to the predetermined position depicted in FIG. 2, the roller 16 moves radially inwardly. Thus, the generally annular surface on the left side of the flange portion 5b engages the roller 16. Then, as the cylindrical member 5 translates back to the left, this annular surface pushes against the roller 16 and causes the bellcrank to rotate about its pivot point 20 (FIG. 3). In response, a releaser pin 14 of the abovementioned releaser means is driven upwardly. The driving connection between the releaser pin 14 and the bellcrank 12 is made by a pin 15, which is attached to the releaser pin 14 so as to project between tines of a forked-shaped end of the upper arm of the bellcrank. A guide block 15a for the releaser pin 14 is provided. A spring 19 wound around the releaser pin 14 provides a driving bias force for urging the bellcrank 12 to rotate counterclockwise so as to return to its initial position.

Consider now the details of the operation of the above-described arrangement. When the electromotor 1 is energized after completion of a shutter or exposure operation, its shaft rotates to provide torque that is transmitted through the gears 2, 3 and 4 to the gear portion 5a of the cylindrical member 5. Thus, the cylindrical member rotates with the electromotor shaft. At the same time, the clutch mechanism, comprising the stepped cam surface and the roller 6, is engaged so that driving torque is transmitted to the bevel gear 7. The bevel gear 9, being in engagement with said bevel gear 7, is also driven to rotate the take-in shaft 10 and the joint 11, causing each film transport. Each film transport is accomplished by a predetermined rotation of the take-in shaft 10 so that the bevel gear 7 also may be stopped at a predetermined angular position after completion of each film transport by appropriately selecting the number of teeth for the two bevel gears 7 and 9. At this angular stopping position, the roller 6 rides on the projecting surface of the cylindrical cam portion 5d of the cylindrical member 5 and thereby the cylindrical member 5 translates to the right as seen in FIG. 1 against the action of the spring 17. By this translatory movement of the cylindrical member 5, the roller 16 which initially had been adjacent to the flange portion 5b now is adjacent to the peripheral surface of the circular cam portion 5c (see FIGS. 2 and 4).

The bellcrank 12 is normally biased by the spring 19 in a counterclockwise direction as seen in FIG. 1 relative to the axis defined by the pivot 20; and, in addition, its depending arm 12b is urged by the spring 18 against the circumferential surface of the flange portion 5b. Owing to this biasing of the spring 18 the roller 16 which was at the position on this circumferential surface is now, upon completion of film transport, brought by movement of the cylindrical member 5 to a position preparatory for shutter release. At this position, the roller 16 bears against a diameter reduced portion of the circular cam portion 5c. As the electromotor 1 continues to rotate, the projecting surface of the circular cam portion 5d of the cylindrical member 5 passes by the position at which said projecting surface is in slidable contact with the roller 6 and, at this moment, the cylindrical member translates back to the initial position owing to the action of the spring 17. As the cylindrical member 5 is thus translated, the roller 16, which has been locked by the generally annular side surface of the flange portion 5b against the diameter reduced portion of the circular cam portion 5c, now moves to the left as seen in FIG. 1 and rotates the bellcrank 12 around the pivot 20 clockwise as seen in FIG. 3, pushing the pin 15 and the releaser pin 14 up so that said releaser pin 14 may release the camera shutter.

When further rotation of the electromotor 1 brings the roller 16 to a position at which said roller 16 comes into contact with a diameter enlarged portion of the circular cam portion 5c to cancel the release holding effect, the releaser lever 12 rotates under the action of the spring 19 in a counterclockwise direction and causes the roller 16 to slide off from the circular cam portion 5c again into contact with the circumferential surface of the flange portion 5b corresponding to the initial position. When the electromotor 1 is energized again upon completion of the next shutter operation, the cylindrical cam portion 5d and the roller 6 are brought again into engagement to accomplish a successive film transport.

With the device of the present invention which operates, as described hereinbefore, through repetition of the cycle —the position A preparatory for release — the position B for release — the position C for removal of release holding effect — the initial position D, the roller 16 operates following a quadrangle and thereby provides a release holding time. The position at which the roller 6 is stopped upon completion of transport may be determined by setting the number of teeth of both bevel gears 7 and 9, so that it is possible for the time intervals among the time points of transport completion, release, restoration and transport starting to be optionally set without operation overlapping by designing the cylindridal cam portion 5d and the circular cam portion 5c of the cylindrical member 5 in due consideration of said number of teeth.

As understood from the aforegoing description of the preferred embodiment of this present invention, there is provided a releaser device of such an arrangement that there is disposed between the drive transmission system for automatic transport and the releaser pin the lever member of which the operation is put under control of the cam mechanism to obtain an appropriate release holding time and thereby reliable release operation may be achieved with simple and compact construction.

What is claimed is:

1. In an automatic film transport type camera, the combination comprising:

an electromotor having a rotatable shaft;
a rotatable take-in shaft for the film;
a transmission mechanism for intermittently driving the take-in shaft in response to rotation of the motor shaft so that an unexposed portion of the film is transported to a position where it remains stationary during an exposure operation;
the transmission mechanism including a generally cylindrical member geared for rotation with the motor shaft, means for imparting a reciprocating translatory motion to the cylindrical member so that in the course of each revolution it translates toward and then away from a predetermined position, and means operatively engaged with the cylindrical member while it translates toward the predetermined position for rotatably driving the take-in shaft; and
means for actuating the exposure operation while the cylindrical member is translating away from the predetermined position.

2. The combination of claim 1 wherein the actuating means includes releaser means operable for directly actuating the exposure operation, a bellcrank having a first arm engaged with the releaser means so that rotation of the bellcrank about the bellcrank pivot point controls the operation of the releaser means, a second arm of the bellcrank projecting toward the cylindrical member, and means operative during each revolution of the cylindrical member for imparting a cyclical motion to the second arm so that its end sequentially moves from an initial position radially inwardly with respect to the cylindrical member, moves longitudinally with the cylindrical member as the cylindrical member translates away from the predetermined position, moves radially outwardly, and then moves longitudinally relative to the cylindrical member to return to the initial position.

3. The combination of claim 2 wherein the cylindrical member includes a flange portion and a cam portion that are axially adjacent, the flange portion having a cylindrical surface portion against which the second arm bears while at the initial position, the flange portion further having a generally annular surface that pushes against the second arm as the cylindrical member translates away from the predetermined position, the cam portion acting against the second arm to push it radially outwardly.

4. A shutter releaser device in a photographic camera of automatic film transport type comprising:

a. a movable member of a clutch mechanism provided in a drive transmission system for film transport having an operation cycle such that said movable member drives at its initial or retracted position a film transport mechanism as an electromotor rotates by one cycle after completion of shutter operation, then, as a result of increase of load occurring upon completion of film transport, moves to a position preparatory for release where said movable member performs sliding rotation, then, returns to said retracted position while continuing said sliding rotation and finally stopped at a position for driving of said film transport mechanism;

b. a flange portion formed on said movable member so as to have its cylindrical surface on a peripheral wall of said movable member;

c. a circular cam portion integrally formed on said movable member adjacent said flange portion, of which cam surface includes a part projecting beyond said cylindrical surface of said flange portion and the rest part being lower than said cylindrical surface; and d. a releaser member adapted to bear at one end against the cylindrical surface of said flange portion or the cam surface of said circular cam portion and to drive at the other end a shutter releaser mechanism, so arranged that operation of said flange portion and circular cam portion occurring as one operation cycle of said movable member goes on causes said one end to bear against the cylindrical surface of the flange portion during the driving of film transport, movement of said movable member to the position preparatory for release occurring upon completion of film transport causes said one end to bear against the lower cam surface of the circular cam portion, the subsequent return of said movable member to its initial or retracted position causes said one end to be operated by the side of said flange portion and thereby said other end effects shutter release, the subsequent rotation of said movable member at said initial or retracted position causes said one end to bear against the projecting cam surface and then to transfer from said projecting cam surface to the cylindrical surface of the flange portion to complete each shutter release or each cycle of release operation.

* * * * *